United States Patent [19]

Eddy

[11] Patent Number: 5,517,750
[45] Date of Patent: May 21, 1996

[54] APPARATUS FOR SALVAGING CORE LAMINATIONS

[75] Inventor: Samuel J. Eddy, Copan, Okla.

[73] Assignee: Submersible Pumps, Inc., Cushing, Okla.

[21] Appl. No.: 276,956

[22] Filed: Jul. 18, 1994

[51] Int. Cl.$^6$ .................................................. H02K 15/02
[52] U.S. Cl. .......................... 29/762; 29/426.3; 29/426.4; 29/596
[58] Field of Search ............................. 29/762, 738, 732, 29/736, 596, 609, 426.3, 426.4, 426.5

[56] References Cited

U.S. PATENT DOCUMENTS

| | | | |
|---|---|---|---|
| 3,176,550 | 4/1965 | Marcotte | 81/9.51 |
| 4,007,533 | 2/1977 | Brandon et al. | 29/762 |
| 4,051,749 | 10/1977 | Bell et al. | 81/9.51 |
| 4,188,702 | 2/1980 | Herbert | 81/9.51 |
| 4,189,828 | 2/1980 | Chadwick, Jr. | 29/762 |
| 4,614,135 | 9/1986 | Ito et al. | 81/9.41 |
| 4,993,287 | 2/1991 | Carpenter et al. | 81/9.51 |
| 5,001,828 | 3/1991 | Missman | 29/426.4 |
| 5,199,159 | 4/1993 | Waldsmith | 29/426.4 |

Primary Examiner—Carl E. Hall
Attorney, Agent, or Firm—Dougherty, Hessin, Beavers & Gilbert

[57] ABSTRACT

Apparatus and method for salvaging core laminations from the core and windings of an electric motor include a first station for inserting a stop between adjacent core laminations at a first point such that the stop contacts the flux zone of the laminations in order to prevent motion of the core along the longitudinal axis of the core. A second station is provided for separating adjacent laminations at a second point between the first station and a free end of the core and windings, thereby breaking the bonding agent adjacent the second point and creating an end section of the core laminations. A longitudinal force is exerted on the flux zone of the laminations at the second point and directed toward the free end of the windings in order to move the end section toward the free end of the windings. The longitudinal force shears the laminations in the end section from the bonding agent and windings.

9 Claims, 4 Drawing Sheets

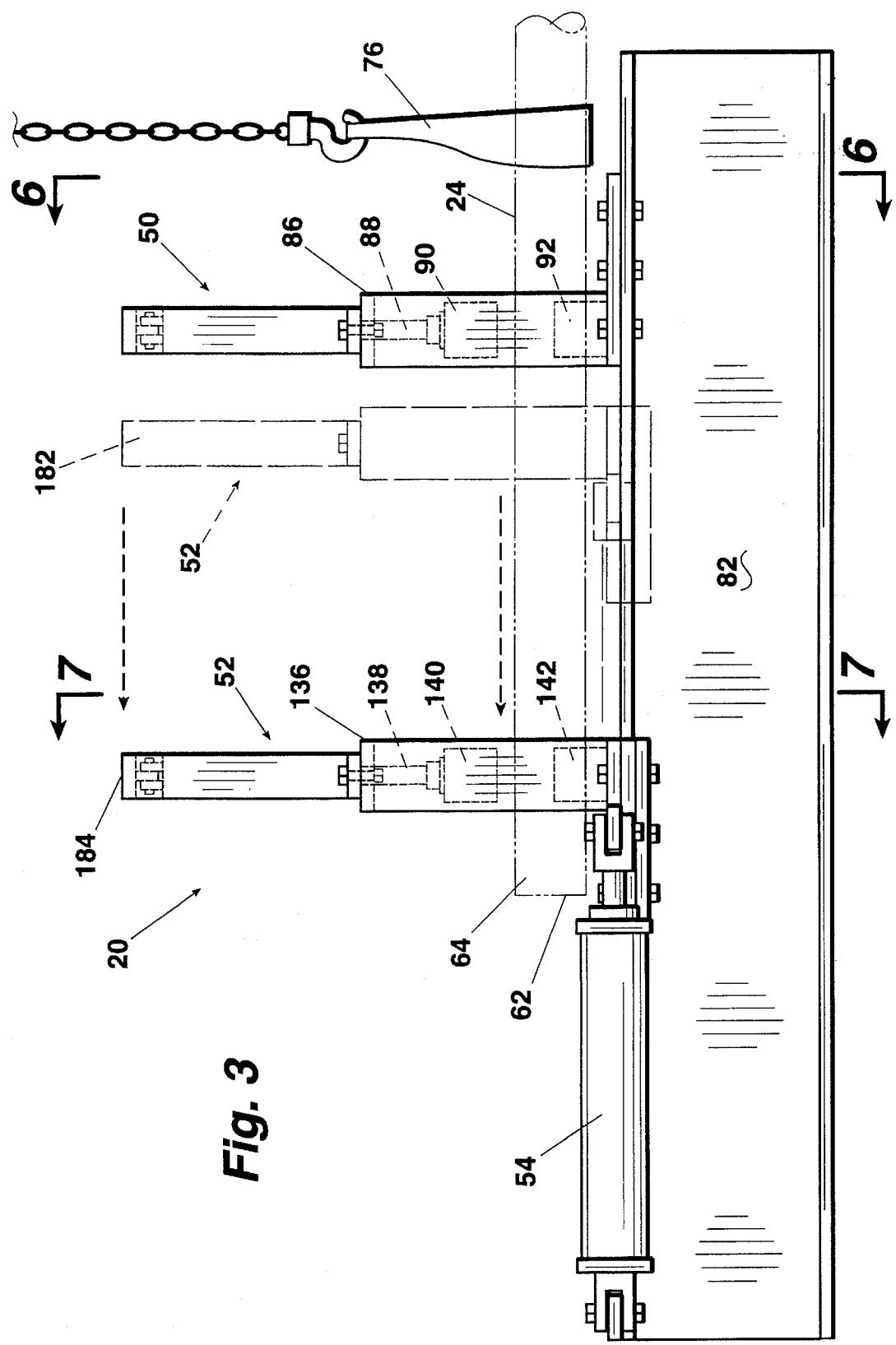

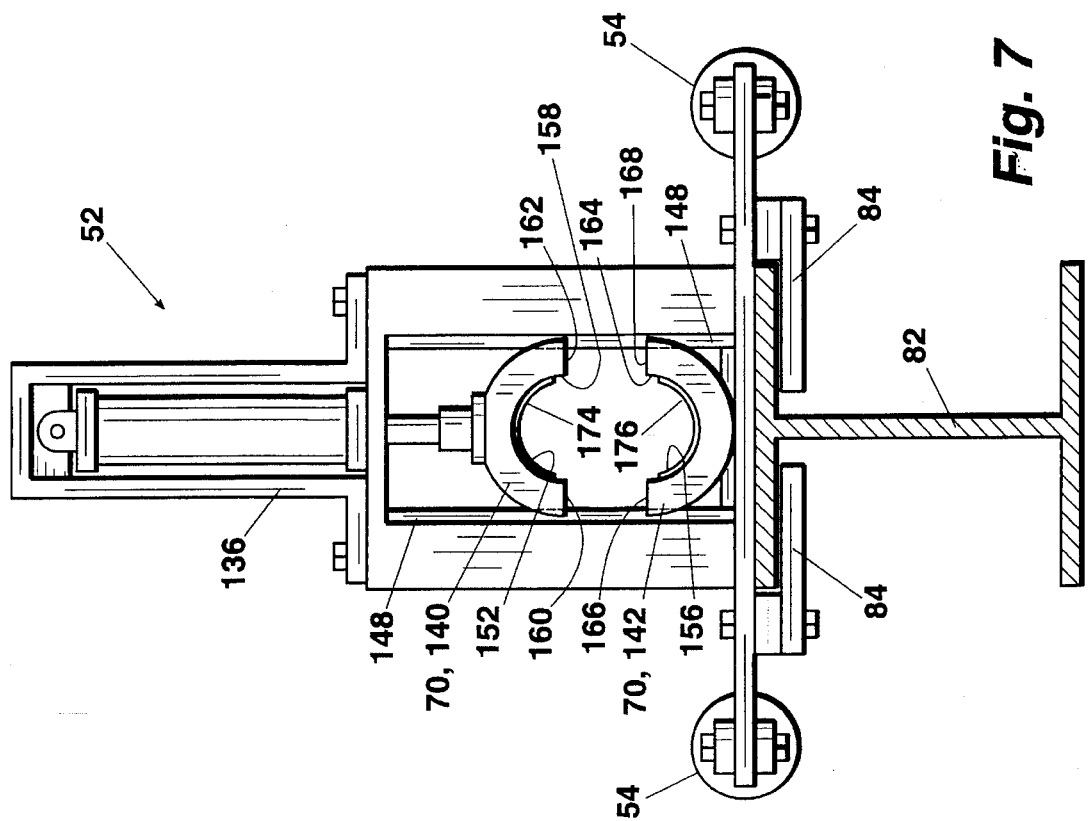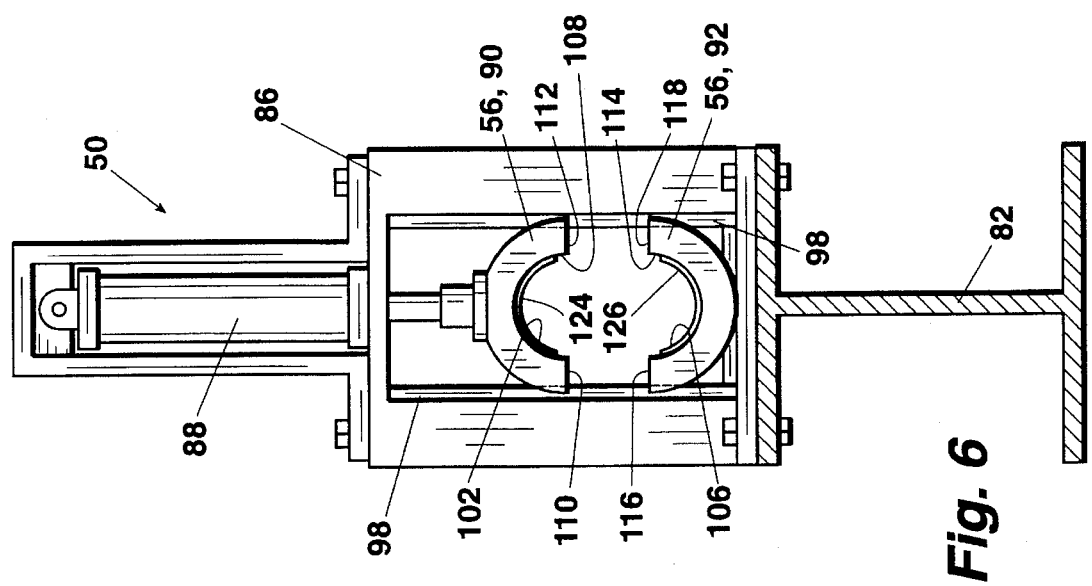

APPARATUS FOR SALVAGING CORE LAMINATIONS

BACKGROUND OF THE INVENTION

This invention relates to apparatus and method for salvaging core laminations from the core and windings of an electric motor and more particularly, but not by way of limitation, relates to such apparatus and method for use with elongated electric motors, such as those used with submersible pumps.

Electric motors typically have stators made of a plurality of annular disks, commonly referred to as "laminations." The laminations typically have generally parallel and planar sides and a plurality of slots surrounding the inner periphery of each lamination. In the electric motors used to drive submersible pumps, the laminations are typically inserted in a housing or shell in which they are juxtaposed such that the central openings in the annular laminations form a central passageway for housing a rotor and the slots are aligned to form continuous slots or passageways extending the length of the "core" formed by the laminations. Coil wires or windings are placed in the slots, normally within Teflon® pen tubes, as is known in the industry.

Prior to 1974, a polyester resin varnish was injected into the slots to secure the windings in the slots and coat the windings. When a motor needed to be rebuilt, the windings were pulled from the slots and the laminations were left in the shell for rewinding.

About 1974, most of the submersible pump industry switched from the oven-cured polyester resin varnish to a chemically-cured or catalyzed epoxy varnish. The epoxy varnish is injected or inducted into the slots and bonds to the edges of the slots and to the windings and thereby holds the windings and the laminations in place. In other words, as well as bonding the windings within the slots, the epoxy varnish also bonds the laminations to the windings and the laminations to one another. The epoxy varnish gained widespread acceptance because it hardens rapidly, more completely fills the slots surrounding the windings, and is more moisture resistant than the polyester resin varnishes. However, it is not possible to pull the windings from the slots when epoxy varnish has been used. The greater strength of the epoxy varnish causes the windings to break and causes damage to the laminations. This is particularly true with the elongated electric motors used to drive submersible pumps, which are commonly 20 to 30 feet in length. The salvage value of the core laminations and windings has encouraged substantial research into methods of economically removing the windings and laminations from electric motors in which the epoxy varnish has been used. (The current market price for new laminations is about 24 cents each and they cost approximately 18 cents each to manufacture. The invention will allow laminations to be salvaged at a cost of approximately 0.015 cents each.) To the knowledge of the applicant, prior to the present invention, an economically viable method and apparatus of doing so has not been available. It is also noteworthy that the efficiency of laminations increases as they are reused.

U.S. Pat. No. 5,001,828 (Missman) discloses an apparatus for removing coil wire from a stator. The Missman apparatus is labor intensive in that a push rod must be positioned over and in alignment with each stator slot and pushed through the stator slot to clear the slot of wire and insulation. There are typically 18 slots in the stator of an electric motor for a submersible pump. U.S. Pat. No. 5,199,159 (Waldsmith) discloses a method for the cryogenic removal of copper wiring from the magnetic core of an electromagnetic machine. Although this method may be acceptable for smaller electric motors, to the best knowledge of the applicant, its economic and technical viability with electric motors as large as those used with submersible pumps has not been demonstrated.

U.S. Pat. No. 4,051,749 (Bell et al.) discloses a cable insulation stripping apparatus used for stripping insulating casing from electrical cable. The apparatus includes a pair of cable clamping assemblies, one of which is adapted to substantially sever a portion of the cable insulation being removed and the other which is used to rigidly clamp around the circumference of the cable to assist in the retention of the cable. This apparatus is not suitable for removing core laminations from an electric motor in that core laminations are not rigid enough to withstand a circumferential surface clamping strong enough to hold against the longitudinal forces necessary to shear core laminations from windings. In the applicant's experience, under such forces the core laminations bend or collapse within the circumferential clamp and the longitudinal forces exerted to remove core laminations from the windings pull the core through the circumferential clamping assembly, thereby bending and destroying the core laminations. Since electrical cable insulation is not normally bonded to the cable insulated, such shearing forces are not a concern in electrical cable insulation stripping apparatus.

Therefore, there is a need for an apparatus and method for salvaging core laminations from the core and windings of an electric motor which is relatively inexpensive, which reduces labor requirements, and which minimizes damage to the windings and core laminations.

SUMMARY OF THE INVENTION

The present invention is contemplated to overcome the foregoing deficiencies and meet the above-described needs. In doing so, the invention provides a novel and improved apparatus and method for salvaging core laminations from the core and windings of an electric motor.

The core includes a plurality of annular laminations having a central cavity, a plurality of winding slots surrounding an inner periphery of the laminations, and a flux zone extending between the outer edge of the slots and an outer periphery of the laminations. The laminations are fixed about the longitudinal axis of the central cavity by a bonding agent which bonds the windings to the slots. A first station means is provided for inserting a stop between adjacent laminations at a first point. The stop contacts the flux zone of the laminations in order to prevent motion of the core along the longitudinal axis. A second station means is provided for separating adjacent laminations at a second point located between the first station means and a free end of the core and windings and for breaking the bonding agent adjacent the second point and creating an end section of the core laminations. Moving means are provided for exerting a longitudinal force on the flux zone of the laminations at the second point which is directed toward the free end of the windings and which moves the end section toward the free end of the windings. The moving means shears the laminations in the end section from the bonding agent and windings. Preferably, the second station means includes a wedge which the second station means forces from the outer periphery of the core to the outer edge of the slots. The moving means moves the wedge toward the free end of the core in order to shear the laminations in the end section from the bonding agent and windings.

Advancing means are provided for advancing the core from the first station means beyond the second station means. Preferably, the advancing means advances the core from the first station means toward the second station means and aligns the laminations previously separated at the first station means with the second station means for separation at the second station means.

BRIEF DESCRIPTION OF THE DRAWINGS

The present invention will be better understood with reference to the example of the following drawings:

FIG. 3 is a schematic view of the apparatus and method of the present invention.

FIG. 6 is a view taken along line 6—6 of FIG. 3.

FIG. 7 is a view taken along line 7—7 of FIG. 3.

DETAILED DESCRIPTION OF THE PREFERRED EMBODIMENTS

Figure 2:
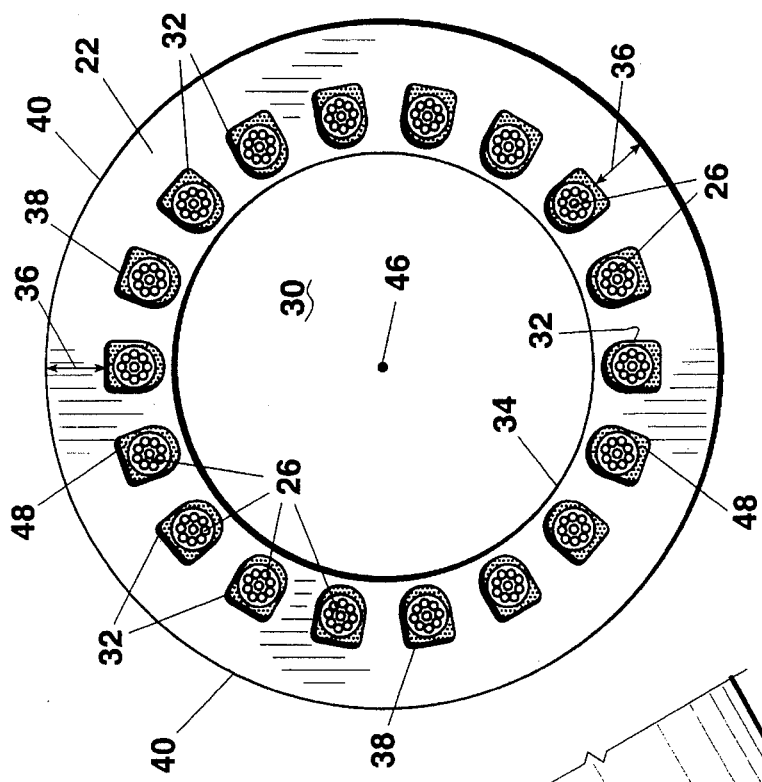
FIG. 2 is an end elevational view of a lamination of an electric motor.

Preferred embodiments of the invention will now be described with reference to the drawings. Like reference characters refer to like or corresponding parts throughout the drawings and description.

FIGS. 1–7 present embodiments of the apparatus and method for salvaging core laminations of the present invention. Although a preferred embodiment of the apparatus and method 20 (FIG. 3), described herein to facilitate an enabling understanding of the invention, is used with an elongate electric motor, such as used with a submersible pump, it is intended to be understood that the invention may be adapted to other applications.

Referring to the example of FIGS. 1–3, the apparatus 20 for salvaging core laminations 22 from the core 24 and windings 26 of an electric motor 28 will now be described. The core 24 includes a plurality of annular laminations 22 having a central cavity 30, a plurality of winding slots 32 surrounding an inner periphery 34 of the laminations, and a flux zone 36 extending between the outer edge 38 of the slots and an outer periphery 40 of the laminations 22. The laminations are fixed about the longitudinal axis 46 of the central cavity 30 by a bonding agent 48 which bonds the windings 26 to the slots 32.

Figure 4:
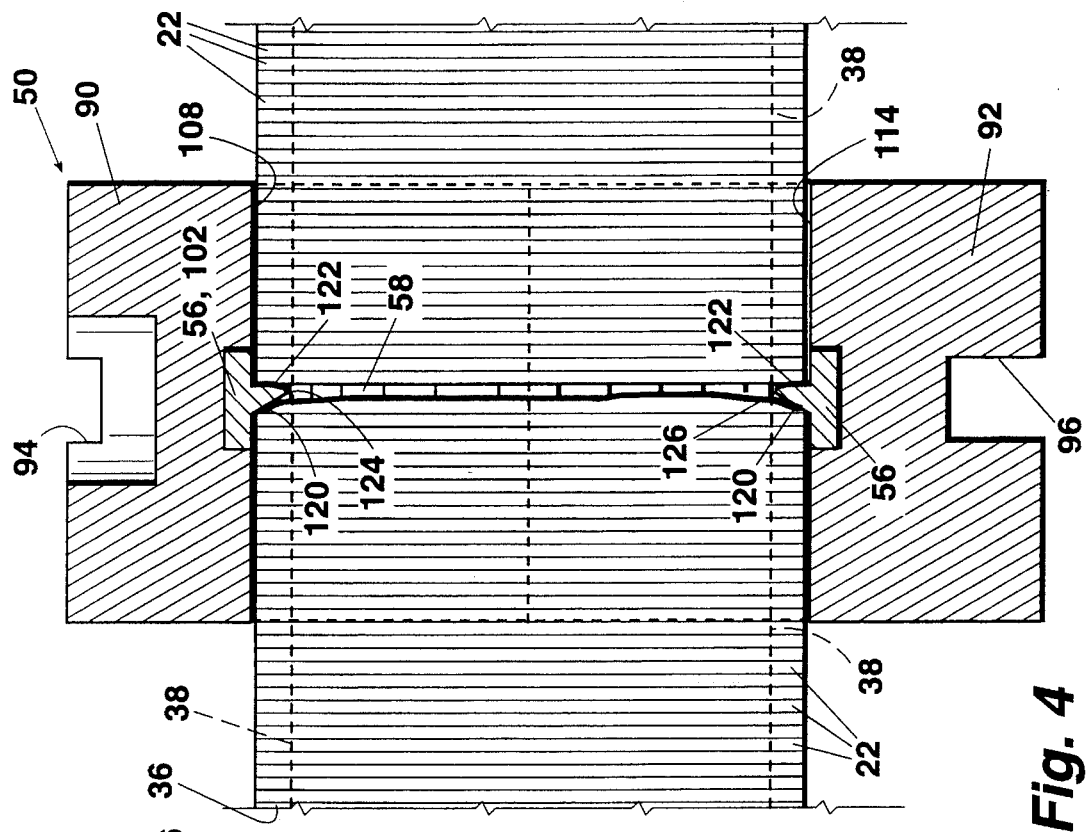
FIG. 4 is a cross-sectional view of an embodiment of a wedge of the stationary first station means engaged with a core of an electric motor.
Figure 5:
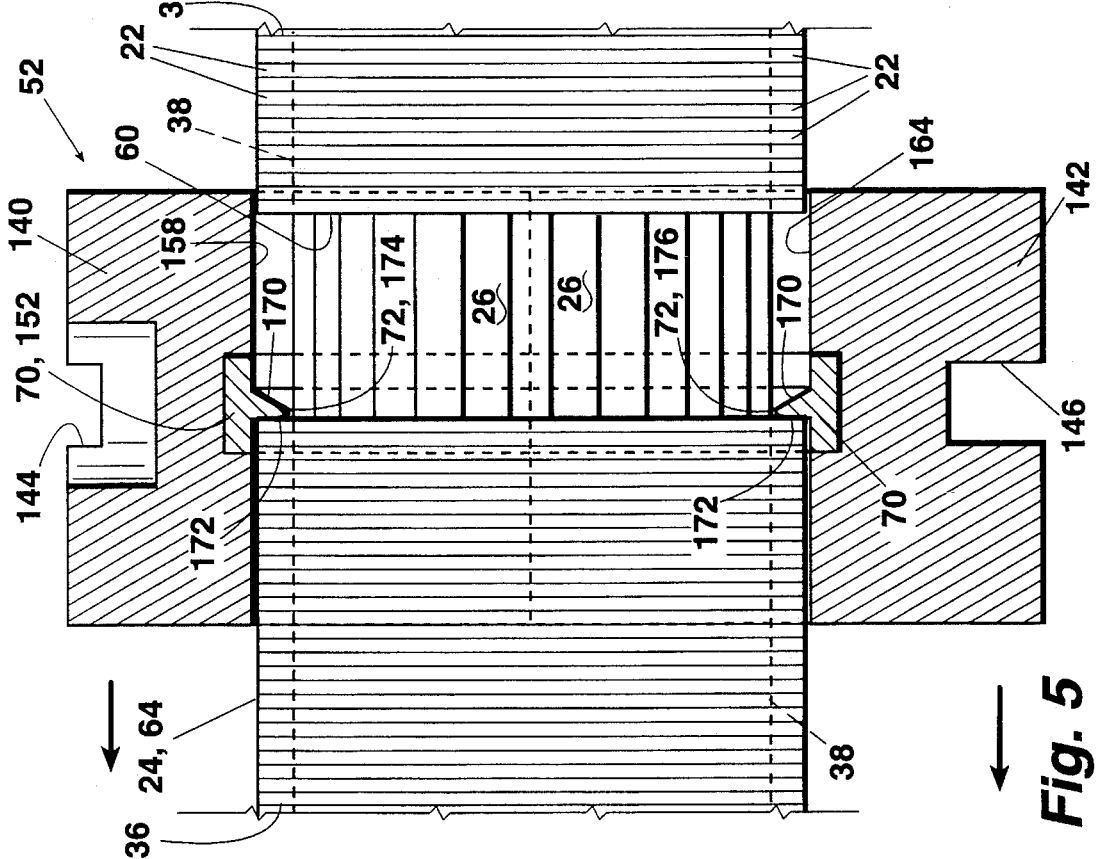
FIG. 5 is a cross-sectional view of an embodiment of a wedge of the second station means engaged with a core of an electric motor.

Referring to example FIGS. 3–5, the apparatus 20 may be generally described as including first station means 50, second station means 52, and moving means 54. The first station means is used for inserting a stop 56 between adjacent laminations 22 at a first point 58. The stop 56 contacts the flux zone 36 of the laminations 22 in order to prevent motion or movement of the core 24 along the longitudinal axis 46. The second station means 52 is used for separating adjacent laminations 22 at a second point 60 between the first station means 50 and a free end 62 of the core 24 and windings 26, thereby breaking or weakening the bonding agent 48 adjacent the second point 60 and creating an end section 64 of the core laminations 22. The moving means 54 is used for exerting a longitudinal force toward and in the direction of the free end 62 of the windings 26 on the flux zone 36 of the laminations 22 at the second point 60 and thereby moving the end section 64 toward the free end 62 of the windings 26. In doing so, the moving means 54 shears the laminations 22 in the end section 64 from the bonding agent 48 and windings 26.

Preferably, the second station means 52 separates adjacent laminations 22 at the second point 60 by wedging the adjacent laminations 22 apart. The preferred second station means 52 includes a wedge 70 and the second station means 52 forces the wedge from outside the outer periphery 40 of the core 24 to the outer edge 38 of the slots 32. The wedge 70 has an inside edge 72 and the second station means 52 forces the wedge 70 between the laminations 22 to an engaged position (illustrated in FIG. 5) in which the inside edge 72 of the wedge 70 is at the outer edge 38 of the slots 32. The inside edge 72 of the wedge 70 may extend radially inwardly (toward the windings 26) beyond the outer edge of the slots 32 but must not force the windings 26 into damaging contact with the inner periphery 34 of the core laminations 22, as will be further discussed below. The moving means 54 moves the wedge 70 in the engaged position toward the free end 62 of the windings 26.

Referring to the example of FIG. 3, the apparatus includes advancing means 76 for advancing the core 24 from the first station means 50 beyond the second station means 52. The preferred advancing means 76 advances the core 24 from the first station 50 toward the second station 52 and aligns the laminations previously separated at the first station means 50 with the second station means 52 for separation at the second station means 52. By doing so, the apparatus 20 minimizes the number of laminations damaged by the first and second station means 50, 52.

Referring to the example of FIGS. 1–5, the method for salvaging core laminations 22 from the core 24 and windings 26 of an electric motor 28 may be generally described as comprising: (1) inserting a stop 56 between adjacent laminations 22 at a first station 50 so that the stop 56 separates the laminations 22 and contacts the flux zone 36 of the laminations 22 in order to prevent motion of the core 24 along the longitudinal axis 46; (2) separating adjacent laminations 22 at a second station 52 located between the first station 22 and a free end 62 of the core 24 and windings 26 and thereby breaking or weakening the bonding agent at the second station 52 and creating an end section 64 of the core 24 and laminations 22; and (3) exerting a longitudinal force directed toward the free end 62 of the windings 26 on the flux zone 36 of the laminations 22 at the second station 52 and thereby moving the end section 64 toward the free end 62 of the windings 26. The longitudinal force shears the laminations 22 in the end section 64 from the bonding agent 48 and windings 26.

Preferably, the laminations 22 are separated at the second station 52 by wedging adjacent laminations apart. More preferably, the method includes forcing a wedge 70 from outside the outer periphery 40 of the core 24 and laminations 22 radially inwardly to the outer edge 38 of the slots 32. The preferred wedge 70 has inside edge 72 which is forced between the laminations 22 to an engaged position 74 in which the inside edge 72 of the wedge 70 is at the outer edge 38 of the slots 32. The method further provides for moving the wedge 70, preferably in the engaged position 74, toward the free end 62 of the windings 26 and thereby shearing the laminations in the end section 64 from the bonding agent 48 and windings 26. Preferably, the wedge 70 is moved toward the free end 62 of the windings 26 a sufficient distance to remove the end section 64 from the windings 26. Normally, there is no bonding between individual laminations 22 other than their common bonding through bonding agent 48 with windings 26 and once the laminations have been sheared from the bonding agent 48 and windings 26, the laminations are freed into discrete, individual laminations 22.

The method further provides for advancing the core 24 from the first station 50 beyond the second station 52 once the end section 64 has been sheared from the windings 26. Once the core 24 has been advanced from the first station 50 beyond the second station 52, the previously explained steps, enumerated (1), (2), and (3) supra, may be exercised to move another end section 64 toward the free end 62 of the windings 26. The method also provides for advancing the core 24 from the first station 50 toward the second station 52 and aligning the laminations 22 previously separated at the first station 50 with the second station 52 for separation at the second station 52 and repeating the previously described steps, enumerated (1), (2), and (3) supra.

Figure 1:
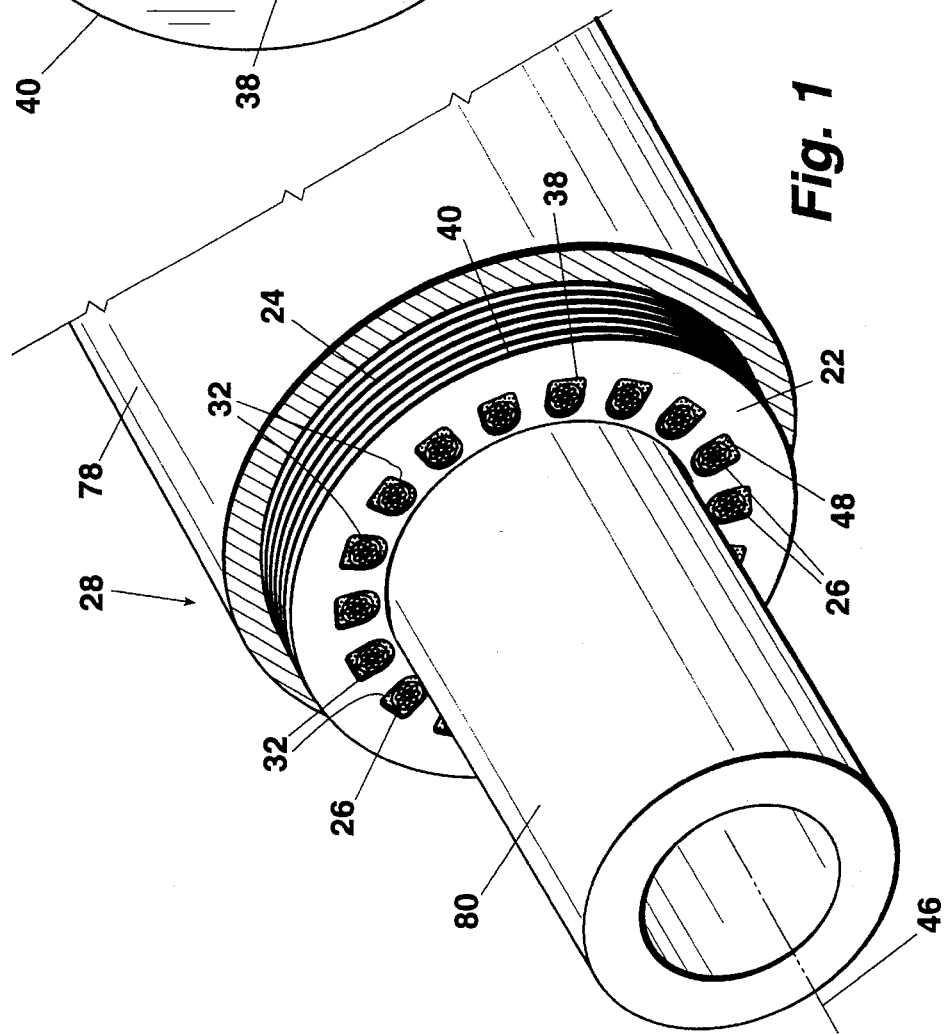
FIG. 1 is a cutaway perspective view of an end of the rotor, core, windings, and shell of a motor for a submersible pump.

Referring to the example of FIGS. 1 and 2, the prototype apparatus and method is used for salvaging laminations 22 from the electric motor used with submersible pumps. The annular laminations 22 are made of thin (on the order of 0.002 to 0.003 inches thick) ferromagnetic material. Since the electric motors used with submersible pumps are typically 20 to 30 feet long, there are tens of thousands of laminations in the core of a typical submersible pump.

Before beginning the lamination salvage operation, the head and base (not illustrated) are removed from the ends of the motor shell 78, the motor shaft and rotor 80 are removed from the central cavity of the core, the windings 26 (which loop or coil between slots at the ends of the core) are cut at one end of the core (the free end 62), any retaining rings or other devices which hold the core 24 in its housing or shell 78 are removed, and the core 24 is removed from the shell 78, typically with a hydraulic press. The core is then placed into the apparatus 20 with the end 62 of the core having the windings cut extending through the second station means 52 and the other end or remainder of the core extending through the first station means 50.

As exemplified in FIGS. 3, 6, and 7, in the prototype apparatus and method the first and second station means 52 are mounted on a frame 82. The prototype frame is a 20-foot I-beam. The second station means 52 is slidably mounted on the frame to allow motion along the longitudinal axis 46 of the core 24, which is preferably horizontal in orientation. The moving means 54 is a piston-cylinder actuator or equivalent and the prototype moving means 54 includes two hydraulically actuated piston-cylinder actuators 54 connected between the second station means 52 and the frame 82 for moving the second station means 52 towards and away from the first station means 50. The first station means 50 is physically connected to the frame 82 and the second station means 52 sits on top of the frame and has guide plates 84 which extend below the frame 82 and create guide slots which allow the second station means 52 to be moved along the upper flange of frame 82, as would be known to one skilled in the art in view of the disclosure contained herein. The guide plates 84 and slots which they create also serve to keep the second station means 52 and wedge 70 in proper alignment with the core 24 and first station means 50, i.e., the second station means 52 and wedge 70 should travel along the axis 46 of the core 24 with the wedge 70 remaining substantially in a radial plane of the core 24. If the wedge 70 and second station means 52 become misaligned, the laminations 22 in the end section 64 will be damaged.

Referring to example FIGS. 3, 4, and 6, the first station means 50 includes a first stanchion 86 which extends about perpendicularly to and above the frame 82, a piston-cylinder (or equivalent) actuator 88, and stop 56. In the prototype apparatus 20, a piston cylinder actuator 88 is mounted in the stanchion 86 above the frame 82 and core 24.

The prototype stop 56 is a wedge 56 having an upper wedge section 90 and a lower wedge section 92. The lower wedge section 92 is fixed in position within the first stanchion 86 adjacent the frame 82 and the upper wedge section 90 is connected to the actuator 88 so that it may be extended toward and retracted away from the lower section 92 and core 24. In the prototype apparatus, each section 90, 92 of the wedge 56 is generally semi-circular in shape and the sections 90, 92 form a structure having a central opening when the upper section 90 is extended into contact with the lower section 92. The outside circumference of the upper section 90 has a groove 94 and the lower section 92 has a groove 96 which engage rails 98 in the stanchion 86 for fixing the sections 90, 92 within the stanchion 86 and for guiding the movement of the upper section 90 as it is extended and retracted by the actuator 88.

Referring to the example of FIG. 6, in the prototype first stanchion 86, the upper wedge section 90 includes an upper wedge element 102. The upper wedge element 102 is generally concentrically positioned and held in the upper wedge section 90. Similarly, the lower wedge section 92 includes a lower wedge element 106.

Referring to the example of FIGS. 4 and 6, in the prototype first stanchion 86, the upper wedge section 90 has a generally semi-circular interior surface 108 which terminates on either side at end surfaces 110, 112. Similarly, the lower wedge section 92 has a generally semi-circular interior surface 114 which terminates on either side at end surfaces 116, 118. The end surfaces 110, 112, 116, 118 contact to stop travel of the upper wedge section 90 toward the lower wedge section 92 when the upper wedge section 90 is moved to the closed position. When the upper and lower wedge sections 90, 92 are in the closed position, the interior surfaces 108, 114 adjacent the inside faces 120 of the wedge elements 102, 106 (the inside faces 120 face the second station means 52) define a circular passageway through the sections 90, 92 slightly larger in diameter than the outside diameter of the core 24 (approximately 0.007 inch larger in the prototype apparatus 20) and the interior surfaces 108, 114 adjacent the outside faces 122 of the wedge elements 102, 106 define a circular passageway of approximately the same diameter as the outside diameter of the core 24. This allows the interior surfaces 108, 114 to hold the core 24 in position and in proper alignment without exerting pressure on the outside diameter of the core 24 which would damage the laminations 22, as previously discussed.

Referring to the example of FIG. 6, the upper wedge element 102 has an arcuate inside edge 124 and the lower wedge element 106 has an arcuate inside edge 126. Although it is not necessary that the inside edges 124, 126 define a full or closed circle, the inside edges 124, 126 should extend sufficiently around the circumference of the core 24 to prevent longitudinal travel of the core 24 when the second station means 52 shears laminations from the core 24. Also, the inside edges 124, 126 must extend radially inwardly into the laminations 22 a sufficient depth to secure the core 24 against longitudinal travel. It is contemplated that the inside edges 124, 126 of each of the upper and lower wedge elements 102, 106 should extend around at least 60% of the interior circumference of their respective wedge sections 90, 92, i.e., around at least 108° of each semi-circular interior surface 108, 114. In the prototype first stanchion 86, the wedge elements 102, 106 are sized so that the inside edges 124, 126 extend radially inwardly at least to the outer edge 38 of the slots 32.

Referring to the example of FIG. 4, in the prototype first stanchion 86, the outside faces 122 of the upper and lower wedge elements 102, 106 are substantially perpendicular to the longitudinal axis 46 of the core 24. A slight bevel (approximately 15 degrees in the prototype) may be provided on the outside faces 122 adjacent the inside edges 124, 126 to assist the wedge elements 102, 106 in separating the laminations 22. The substantially perpendicular orientation of the outside faces 122 is provided to resist the forces exerted on the outside face 122 by the laminations 22 when the second station means 52 is shearing laminations 22 from the core 24 without bending the laminations adjacent the outside face 122. The inside faces 120 of the wedge elements 102, 106 may have a greater angle with respect to a line perpendicular to the longitudinal axis 46 in order to facilitate the desired wedging separation of the core laminations 22 at the first point 58. In the prototype first stanchion 86, the inside face 120 has a bevel or angle of 30° with respect to a line perpendicular to the longitudinal axis 46.

Referring to the example of FIGS. 3, 5, and 7, in the prototype apparatus 20, the second station means 52 includes a second stanchion 136 which extends about perpendicularly to and above the frame 82, a piston-cylinder (or equivalent) actuator 138, and wedge 70. The wedge 70 has an upper section 140 and a lower section 142. The lower section 142 is fixed in position within the second stanchion 136 adjacent the frame 82 and the upper section 140 of the wedge 70 is connected to the actuator 138 so that it may be extended toward and away from the lower section 142 in core 24. In the prototype apparatus, each section 140, 142 of the wedge 70 is generally semi-circular in shape and the sections 140, 142 form a structure having a central opening when the upper section 140 is extended into contact with the lower section 142. The outside circumference of the upper section 140 has a groove 144 and the lower section 142 has a groove 146 which engage rails 148 in the second stanchion 136 for fixing the sections 140, 142 within the stanchion 136 and for guiding the movement of the upper section 140 as it is extended and retracted by the actuator 138.

Referring to the example of FIGS. 5 and 7, in the prototype second stanchion 136, the upper section 140 includes an upper wedge element 152. Similarly, the lower wedge section 142 includes a lower wedge element 156.

In the prototype second stanchion 136, the upper wedge section 140 has a generally semi-circular interior surface 158 which terminates on either side at end surfaces 160, 162. Similarly, the lower wedge section 142 has a generally semi-circular interior surface 164 which terminates on either side at end surfaces 166, 168. The end surfaces 160, 162, 166, 168 contact to stop travel of the upper wedge section 140 toward the lower wedge section 142 when the upper wedge section 140 is moved to the closed position. When the upper and lower wedge sections 140, 142 are in the closed position, the interior surfaces 158, 164 adjacent the inside faces 170 of the wedge elements 152, 156 (the inside faces 170 face the first station means 50) define a circular passageway approximately the same diameter as the outside diameter of the core 24; and the interior surfaces 158, 164 adjacent the outside faces 172 of the wedge elements 152, 156 define a circular passageway of approximately the same diameter as the outside diameter of the core 24. This allows the interior surfaces 158, 164 to hold the core in position and in proper alignment without exerting pressure on the outside diameter of the core 24 and thereby damaging the laminations 22, as previously discussed.

Referring to the example of FIG. 7, the upper wedge element 152 has an arcuate inside edge 174 and the lower wedge element 156 has an arcuate inside edge 176. Although it is not necessary that the inside edges 174, 176 define a full or closed circle, the inside edges 174, 176 should extend sufficiently around the circumference of the core 24 to ensure sufficient breakage and weakening of the bonding agent around the core 24 at the second point that the end section 64 will easily separate from the remainder of the core 24 when the second station means 52 is moved towards the free end 62 of the windings 26 by moving means 54. It is contemplated that the inside edges 174, 176 of each of the upper and lower wedge elements 152, 156 should extend around at least 60% of the interior circumference of their respective housings 150, 154, i.e., around at least 108° of each semi-circular interior surface 158, 164. In the prototype second stanchion 136, the wedge elements 152, 156 are sized so that the inside edges 124, 126 extend at least to the outer edge 38 of the slots 32 when the wedge sections 140, 142 are in the closed position.

Referring to the example of FIG. 5, in the prototype second stanchion 136, the outside faces 172 of the upper and lower wedge elements 152, 156 are substantially perpendicular to the longitudinal axis 46 of the core 24. A slight bevel (approximately 15° in the prototype) may be provided on the outside faces 172 adjacent the inside edges 174, 176 to assist the wedge elements 152, 156 in separating the laminations 22. The substantially perpendicular orientation of the outside faces 172 is provided to provide maximum transfer of the longitudinal forces exerted by the outside face 172 on the laminations 22 when the second station means 52 is moved to shear laminations 22 from the core 24; and to do so without bending the laminations adjacent the outside face 172. The perpendicular orientation of the outside face 172 aids in maintaining the perpendicular alignment of the laminations 22 with the longitudinal axis 46 and windings 26 in order to prevent the laminations 22 from twisting and bending on the windings 26. The inside faces 170 of wedge elements 152, 156 may have a greater angle with respect to a line perpendicular to the longitudinal axis 46 in order to facilitate the desired wedging separation of the core laminations 22 at the second point 60. In the prototype second stanchion 136, the inside face 170 has a bevel or angle of 30° with respect to a line perpendicular to the longitudinal axis 46.

During operation, the second station means 52 moves horizontally between a first position 182 nearest to the first station means 50 and a second position 184 which is farther away from the first station means 50. Assuming the second station means 52 is in the first position 182 and that the upper wedge sections 90, 140 have been retracted away from the lower wedge sections 92, 142 by the actuators 88, 138; a core 24 is inserted through the first and second station means 50, 52 so that it rests upon the lower wedge sections 92, 142 with a free end 62 of the core 24 extending through the second station means 52 away from the first station means 50. The actuators 88, 138 are operated to close the upper wedge sections 90, 140 against the lower wedge sections 92, 142 and to thereby separate the laminations 22 at the first and second stations 50, 52. The moving means 54 is then operated to move the second station means to its second position which shears the laminations in the end section 64 from the windings 26 and moves them toward, and preferably removes them from, the free end 62 of the windings 26. Normally, the epoxy varnish only adheres to the edges of the slots 32 and does not extend between the laminations 22 because the laminations 22 are compressed together within the shell or housing 78 when the varnish epoxy is injected or inducted into the slots 32. Therefore, the laminations 22 will normally fall apart into discrete, individual laminations as they are removed from the free end 62 of the windings 26.

The moving means 54 is then operated to return the second station means 52 to the first position 182, the actuators 88, 138 are operated to retract the upper wedge sections 90, 140 away from the lower wedge sections 92, 142, the advancing means 76 is operated to advance the remainder of the core 24 from the first station means 50 through the second station means 52, and the procedure may then be repeated to shear a new end section 64 of laminations 22 from the windings 26. The operation is repeated until substantially all of the core laminations 22 are removed from the windings 26. Preferably, the portion of the windings 26 which is bared as each end section 64 of laminations 22 is removed from the windings 26 is cut off approximately flush with the end of the core laminations 22 nearest the second station means 52 so that the core laminations 22 to be removed in subsequent operations of the second station means 52 do not have to be moved along the length of the previously exposed windings 26. The windings at the opposite end of the core 24 (from the free end 62) are not cut in order to prevent the laminations 22 from being sheared and pushed off the opposite end of the core as the apparatus 20 is operated.

Although the first and second station means 50, 52 may be open and closed simultaneously, in the prototype apparatus 20 the first station means 50 is closed on the core 24 first in order to secure the position and alignment of the core 24 before the second station means 52 is operated. In the prototype apparatus 20, the advancing means 76 is a sling which supports the weight of the core and allows the core 24 to be manually advanced through the first and second station means 50, 52. It is contemplated that future generations of the apparatus 20 will be automated so that a core 24 will be automatically fed through the first and second station means 50, 52 by advancing means 76; and the moving means 54 and actuators 88, 138 will be automated to open, close, and shear core laminations 22 from the windings 26, as would be obvious to one skilled in the art in view of the disclosure contained herein.

Although the length of the end section 64 and number of laminations 22 which may be salvaged from the core 24 with one stroke or movement of the second station means 52 away from the first station means 50 depend upon the epoxy varnish, the strength of the moving means 54, the strength of the components of the first and second station means 50, 52, the amount of epoxy varnish injected into the slots 32, and similar factors, the applicant has found that the apparatus 20 operates most efficiently when between 12 and 30 inches of core laminations 22 are sheared from the windings 26 with each stroke of the second station means 52 away from the first station means 50. The applicant has found that the forces required to remove more than 30 inches of core laminations 22 with one stroke of the second station means 52 results in excessive damage to and loss of the laminations 22. In order to further minimize the number of laminations damaged during the salvage operation, in the prototype apparatus 20 the core 24 is advanced after each removal of laminations 22 a distance equal to the distance between the first and second station means 50, 52 when the second station means 52 is in the first position. By doing so, the second station means 52 separates the laminations 22 at the same point as did the first station means 50 and thereby minimizes the number of laminations 22 damaged by the forced lamination separations at the first and second station means 50, 52.

Although the cores 24 used with most submersible pumps are approximately the same diameter (approximately 5.5 inches), there are differences in the core diameters and in the distance between the outer periphery 40 of the core 24 and the outer edge 38 of the slots 32 in the various types of cores. Therefore, the apparatus 20 is designed so that the wedge sections 90, 92, 140, 142 may be removed from the first and second stanchions 86, 136. In the prototype apparatus 20, the actuators 88, 138 may be removed from the first and second stanchions 86, 136 and the wedge sections 90, 92, 140, 142 will slide along the rails 98, 148 out of stanchions 86, 136. Consequently, the wedge sections 90, 92, 140, 142 and wedge elements 102, 106, 152, 156 may be easily replaced to accommodate variations in different types of cores 24. Although the wedge elements 102, 106, 152, 156 may be made as an integral component of the wedge sections 90, 92, 140, 142, in the prototype apparatus 20 the wedge elements 102, 106, 152, 156 are separate from the wedge sections 90, 92, 140, 142 in order to allow replacement of the wedge elements.

In the prototype apparatus 20, the wedge elements 102, 106, 152, 156 at both of the first and second station means 50, 52 wedge into the laminations to approximately the same depth, preferably to a depth just radially inwardly of the outer edge 38 of the slots 32 and short of contacting the windings 26. Although there are various constructions of laminations and slots 32, the radially extending sides of most slots 32 converge towards the inner periphery of the laminations 22. Therefore, it is important that the wedge elements 102, 106, 152, 156 do not force the windings 26 radially inwardly within the slots 32, as to do so would bend the radially extending sides of the slots 32 or otherwise damage the laminations.

In the prototype apparatus 20, the wedge elements separate the laminations 22 approximately ⅛ inch, which exerts tensile forces on the epoxy varnish sufficient to break it circumferentially around the core 24 at the first and second points 58, 60. It is contemplated that the epoxy varnish or bonding agent breaks due to the tensile forces created by the separation of the laminations 22 before the wedge elements 102, 106, 152, 156 contact the bonding agent. It is not necessary that the epoxy varnish be broken at the first point 58, but the wedge elements 102, 106 must extend radially inwardly between the laminations 22 sufficiently to resist the longitudinal forces created by the second station means 52 as it shears core laminations 22 in the end section 64.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Apparatus for salvaging core laminations from the core and windings of an electric motor, the core including a plurality of juxtaposed annular laminations having a central cavity, a plurality of winding slots surrounding an inner periphery of the laminations, and a flux zone extending between the outer edge of the slots and an outer periphery of the laminations, the laminations being fixed about the longitudinal axis of the central cavity by a bonding agent which bonds the windings to the slots, comprising:

first station means for inserting a stop between adjacent laminations at a first point, the stop contacting the flux zone of the laminations in order to prevent motion of the core along the longitudinal axis;

second station means for separating adjacent laminations at a second point between the first station means and a free end of the core and windings, thereby breaking the bonding agent adjacent the second point and creating an end section of the core laminations; and moving means for exerting a longitudinal force toward the free end of the windings on the flux zone of the laminations at the second point and moving the end section toward the free end of the windings.

2. Apparatus of claim 1:

wherein the moving means is further defined as shearing the laminations in the end section from the bonding agent and windings.

3. Apparatus of claim 1:

wherein the second station means is further defined as wedging the adjacent laminations apart at the second point.

4. Apparatus of claim 1 in which the second station means comprises:

a wedge, the second station means forcing the wedge from the outer periphery of the core to the outer edge of the slots.

5. Apparatus of claim 4:

wherein the moving means is further defined as moving the wedge toward the free end of the core and thereby shearing the laminations in the end section from the bonding agent and windings.

6. Apparatus of claim 1 in which the second station means comprises:

a wedge having an inside edge, the second station means forcing the wedge between the laminations to an engaged position in which the inside edge of the wedge is at the outer edge of the slots.

7. Apparatus of claim 6:

wherein the moving means is further defined as moving the wedge in the engaged position toward the free end of the windings and thereby shearing the laminations in the subsection from the bonding agent and windings.

8. Apparatus of claim 1, comprising:

advancing means for advancing the core from the first station beyond the second station means.

9. Apparatus of claim 1, comprising:

advancing means for advancing the core from the first station toward the second station and aligning the laminations previously separated at the first station means for separation at the second station means.

* * * * *